A. S. HUDSON.
SPRING WHEEL.
APPLICATION FILED MAR. 9, 1912.
1,039,287.
Patented Sept. 24, 1912.
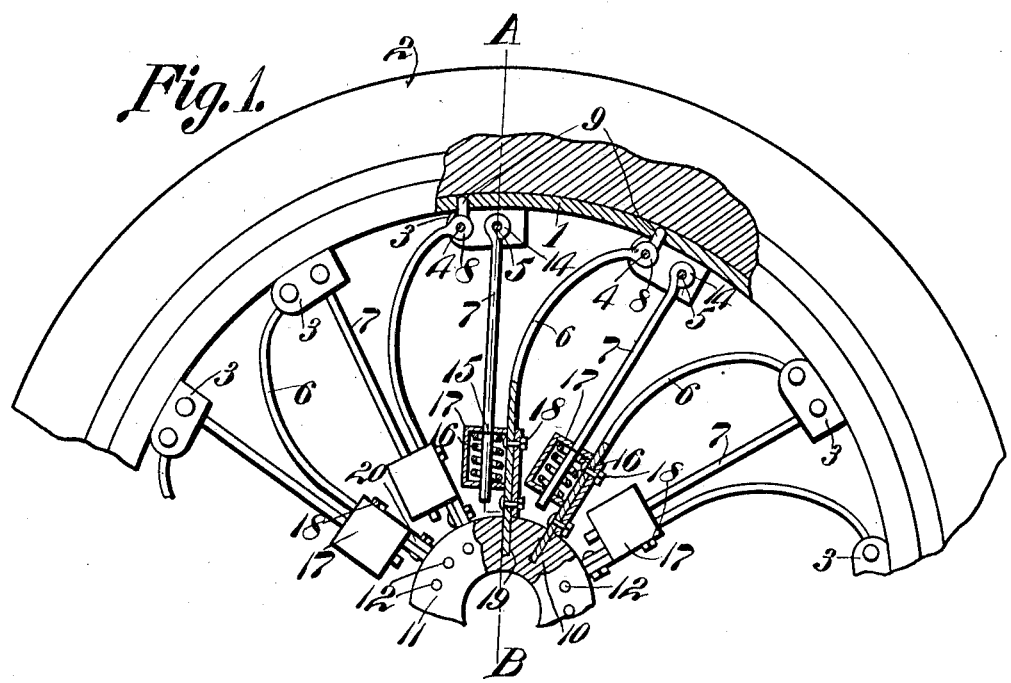
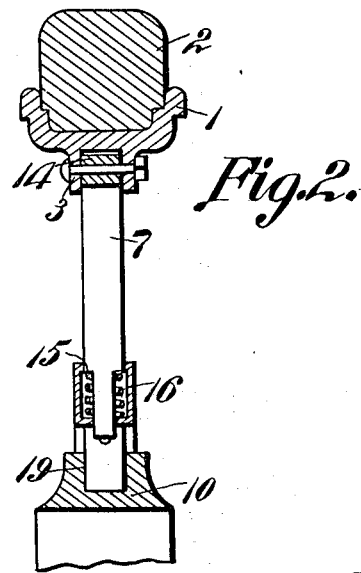
A. S. Hudson,
Inventor
by C. A. Snow & Co.
Attorneys
Witnesses

UNITED STATES PATENT OFFICE.

ALEXANDER S. HUDSON, OF SOURLAKE, TEXAS, ASSIGNOR OF ONE-HALF TO T. S. CROSBIE, OF SOURLAKE, TEXAS.

SPRING-WHEEL.

1,039,287.  Specification of Letters Patent.  Patented Sept. 24, 1912.

Application filed March 9, 1912. Serial No. 682,640.

*To all whom it may concern:*

Be it known that I, ALEXANDER S. HUDSON, a citizen of the United States, residing at Sourlake, in the county of Hardin and State of Texas, have invented a new and useful Spring-Wheel, of which the following is a specification.

The device forming the subject matter of this application, is a wheel having a novel arrangement of spring spokes, whereby pneumatic tires may be dispensed with.

The invention aims to provide a resilient support for the wheel rim, consisting of spokes of novel and improved form, novel means being provided for uniting one set of spokes with the other set of spokes adjacent the hub of the wheel.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows in side elevation, a portion of a wheel, constructed in accordance with the present invention parts being shown in section; and Fig. 2 is a radial section upon the line A—B of Fig. 1.

In the accompanying drawings, the numeral 1 indicates the rim of the wheel, the same supporting the tire 2 which preferably is a solid and unyielding structure. The rim 1 is equipped with inwardly extended ears 3, through which pass pivot elements 4 and 5.

The invention further includes alternately disposed spring spokes 6 and 7, the spokes 6 and 7 being fashioned preferably from flat steel. Intermediate their ends, and relatively near their outer ends, the spokes 6 are equipped with bearings 8, within which the pivot elements 4 are received. Projecting from the bearings 8 are fingers 9, registering in suitable openings fashioned in the rim 1. The inner ends of the spokes 6 register in radial recesses 19 in the hub 10, the inner ends of the spokes 6 being retained in the recesses 19 by means of side plates 11, held upon the hub 10 by means of attaching elements 12. As will be readily understood, the side plates 11 may be removed from the hub 10, for the purpose of replacing the spokes 6.

The primary spokes 6 are curved, and the secondary spokes 7 are straight, the secondary spokes 7 being equipped with bearings 14, receiving the pivot elements 5. The inner ends of the secondary spokes 7 are shouldered, as shown at 15, to constitute abutments for helical compression springs 16, retained within casings 17, the casings 17 being secured to the spokes 6, by means of attaching elements 18. The casings 17 are equipped with inwardly projecting spring fingers 20, engaging the hub 10. The construction, therefore, is such that the casings 17 are held against movement circumferentially of the wheel by means of the primary spokes 6, the casings being restrained against movement radially of the wheel by the engagement between the fingers 20 and the hub 10.

As will be understood readily, the secondary spokes 7 are mounted for sliding movement in the casings 17, so that the springs 16 may be put under tension, the inner ends of the secondary spokes 7 being spaced from the hub 10, and being spaced also from the inner ends of the primary spokes 6.

The arrangement of the spokes 6 and 7 is such that the wheel will have the desired resiliency, both under a vertically applied load, and to resist a horizontal strain, imposed upon the wheel, if the wheel strikes an obstacle. The springs 16 serve to relieve the spring spokes 7 from a strain extended radially of the wheel, and owing to the fact that the spokes 7 are connected with the spokes 6, the spokes 6 and 7 coöperate in affording a resilient support for the rim.

Having thus described the invention, what is claimed is:—

1. A wheel comprising a hub; a rim; primary spring spokes constituting the sole connections between the hub and the rim; secondary spring spokes connected at their outer ends with the rim and spaced at their inner ends from the hub and from the primary spokes; and resilient means for connecting the primary and secondary spokes adjacent the hub, and independently of the hub.

2. A wheel comprising a hub; a rim; primary spring spokes constituting the sole connections between the hub and the rim, the primary spokes being curved in a common direction; a straight spring spoke constituting a chord for one primary spoke and constituting a tangent to the other primary spoke; means for securing one end of the straight spoke to the rim; resilient means engaging the straight spoke and the curved spoke to which the straight spoke is tangent, for supporting the other end of the straight spoke for reciprocation independently of the hub.

3. A wheel comprising a hub; a rim; primary spring spokes constituting the sole connections between the hub and the rim; secondary spring spokes connected at their outer ends with the rim and spaced at their inner ends from the hub and from the primary spokes; and helical springs carried by the primary spokes and affording the sole support of the inner ends of the secondary spokes.

4. A wheel comprising a hub; a rim; primary spring spokes connecting the hub and the rim; secondary spring spokes connected at their outer ends with the rim and spaced at their inner ends from the hub and from the primary spokes; casings supported upon the primary spokes; springs located within the casings; the secondary spokes being mounted for reciprocation in the casings, and being engaged with the springs.

5. A wheel comprising a hub; a rim; primary spring spokes connecting the hub and the rim; secondary spring spokes connected at their outer ends with the rim and spaced at their inner ends from the hub and from the primary spokes; casings carried by the primary spokes, and engaged with the primary spokes against movement circumferentially of the wheel, the casings being engaged with the hub against movement radially of the wheel; springs located within the casings; the inner ends of the secondary spokes being slidable in the casings, and engaged with the springs.

In testimony that I claim the foregoing as my own, I have hereto affixed my signature in the presence of two witnesses.

ALEXANDER S. HUDSON.

Witnesses:
W. W. Dix,
A. Merchant.

---

Copies of this patent may be obtained for five cents each, by addressing the "Commissioner of Patents, Washington, D. C."